Nov. 2, 1965    R. H. LAPP    3,214,999

HARMONIC DRIVE

Filed April 9, 1964

INVENTOR.
ROGER H. LAPP
BY
Claude Funkhouser
ATTORNEY

United States Patent Office 3,214,999
Patented Nov. 2, 1965

3,214,999
HARMONIC DRIVE
Roger H. Lapp, Silver Spring, Md., assignor to the United States of America as represented by the Secretary of the Navy
Filed Apr. 9, 1964, Ser. No. 358,673
10 Claims. (Cl. 74—675)

This invention relates to a speed reduction drive and, more particularly, to an improved dual stage harmonic drive unit.

Harmonic drive devices have recently become available for use in speed reduction application offering many advantages, such as high efficiency, compactness, and large and varied speed reduction ratios. Despite these advantages, there are many applications in which conventional harmonic drive devices are not entirely satisfactory as they do not provide a sufficiently wide range of output speeds and are not capable of bidirectional rotation. Also, conventional harmonic drive devices are not instantaneously responsive upon energization and are not free from backlash. A harmonic drive in which these disadvantages are overcome would have utility in such devices as optical tracking telescopes, radar antenna drives, aircraft control surface actuators, and high precision X–Y plotting equipment.

It is therefore an object of the present invention to provide a harmonic drive having a continuously variable speed reduction ratio with substantially no delay between command and operation.

Another object of the invention is to provide a harmonic drive unit which provides a variable speed, bidirectional output with or without the necessity of reversing the input direction of rotation.

A further object of the invention is to provide a harmonic drive unit having a high variable ratio of input to output speed.

Other objects and many of the attendant advantages of the present invention will be readily appreciated as the same becomes better understood by reference to the following detailed description when considered in connection with the accompanying drawing, wherein.

According to the invention, two harmonic drive units, each having its own input motor, are coupled together. One of the units has a fixed internal gear, while the other unit has a freely rotatable, internal gear which functions as the output shaft of the harmonic drive unit. Both of the input motors constantly run during operation; but, by varying their relative speeds, the output shaft can be made to rotate bidirectionally at varying speeds or to remain stationary.

Figure 1:
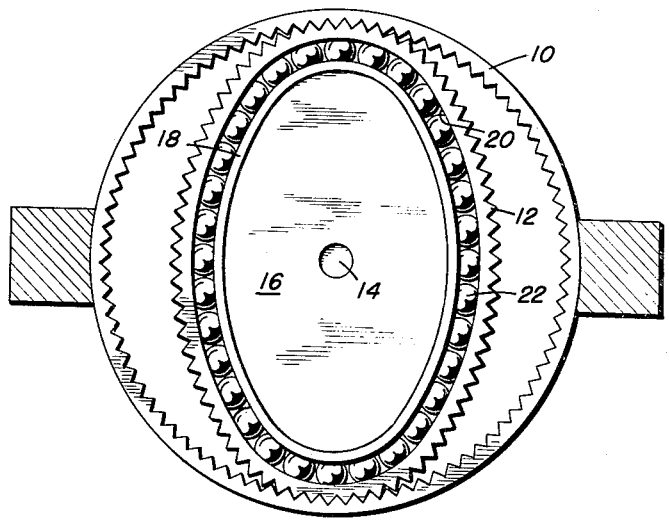
FIG. 1 is an end elevation of the harmonic drive of the prior art.

Referring to FIG. 1, which shows a harmonic drive of the prior art, a fixed, circular, internal gear 10 has disposed therein an externally toothed, flexible ring 12 having fewer teeth than the gear 10. An input shaft 14, coaxial with the internal gear 10, carries an elliptical disk 16. Disposed between the disk 16 and the flexible ring 12 is a ball bearing arrangement comprising a flexible inner race 18 contiguous with the disk 16, a flexible outer race 20 contiguous with the inner periphery of the ring 12, and a plurality of balls 22 mounted between the races. The disk 16 and the ball bearing arrangement together form a wave generator, rotation of the elliptical disk 16 causing the ball bearing races to flex outwardly along the major axis of the disk. Since the ring 12 is flexible, it will also flex outwardly into an elliptical shape in the same manner as the races 18 and 20, and form two diametrically opposite waves moving about the periphery of the ring 12.

The dimensions of the components of the harmonic drive are such that the teeth of the flexible ring 12 engage the teeth of the internal gear 10 at opposite points on the major axis of the ellipse formed by the wave generator. Thus, there is engagement between the ring 12 and the gear 10 by continually moving points, causing the ring 12 to have walking motion about the inner periphery of the gear 10. For every revolution of the wave generator, the flexible ring 12 will rotate in the opposite direction a distance equal to the thickness of a gear tooth multiplied by the difference in the number of teeth between the gear 10 and the ring 12. The number of teeth on the flexible ring 12 must be less than the number of teeth on internal gear 10 by a multiple of two, since the ring is in engagement with the gear at two points at every instant. With this arrangement, high input to output ratios are attained by a harmonic drive unit. For example, if there are 200 teeth on the gear 10, and 198 teeth on the flexible ring 12, the ratio of input shaft speed to output shaft speed will be 100:1.

Figure 2:
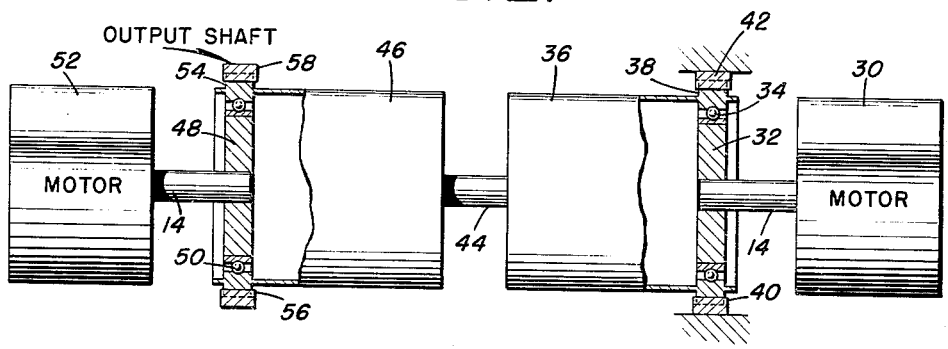
FIG. 2 is a side elevation, shown partially in section, of the speed reduction drive of the present invention.

The present invention is shown in FIG. 2 and comprises two rigidly connected harmonic drive units. A motor 30 is connected by its drive shaft to an elliptical disk 32 having a ball bearing arrangement 34 disposed between the disk and a flexible cup 36. A plurality of equally spaced teeth 38 are formed on the outer periphery of the cup 36, in the same plane as the disk 32, and are adapted to mesh with the teeth 40 of a fixed internal gear 42 when flexed outwardly by the wave generating rotation of the disk.

Rigidly connected to the flexible cup 36 by an axial coupling shaft 44 is a second flexible cup 46. Mounted within the cup 46 adjacent the free end thereof is an elliptical disk 48 and a ball bearing arrangement 50. The disk 48, mounted on the drive shaft of a motor 52, forms a wave generator in combination with the ball bearing arrangement 50. A plurality of teeth 54 are formed on the periphery of the cup 46 and are adapted, when the cup 46 is flexed, to mesh with the teeth 56 of an internal gear 58. Both harmonic drive units are identical with the exception that the internal gear 58, constituting the output shaft of the dual unit, is free to rotate, whereas the gear 42 is fixed.

The number of teeth 38 on the flexible cup 36 is less than the number of teeth 40 on the internal gear 42 by a multiple of two. In order to obtain the highest input to output ratio, the number of teeth 38 should be two less than the number of teeth 40. The number of teeth 54 on the flexible cup 46 is equal to the number of teeth 38, and the number of gear teeth 56 is equal to the number of teeth 40. One revolution of the disk 32 will cause the cup 36 to rotate in the opposite direction a distance equal to the thickness of a gear tooth multiplied by the difference between the number of teeth on the gear 42 and the cup 36; i.e., a distance equal to the thickness of two teeth.

If the motor 52 is running at the same speed as the motor 30, and in the same direction, as viewed from one end of FIG. 2, then the cup 46 will flex and rotate in the same manner as the cup 36. Since the motion of the flexible cups would be identical, the internal gears would also have the same relative motion, causing the freely rotatable gear 58 to remain stationary. By varying the speed of one motor with respect to the other, the gear 58 can be made to rotate in either direction and at a greatly reduced speed. The output of the gear 58 will be equal to the difference in motor speeds, divided by the ratio of input to output speeds of the individual harmonic drives of the dual stage unit.

The operation of the device can best be described by way of specific examples. If the internal gears 42 and 58 each have 200 teeth, and each flexible cup 36 and 46 has 198 teeth, the ratio of input to output speeds of each unit will be 100:1. If the motors 30 and 52 are both running counterclockwise at the same speed, as viewed from the right side of FIG. 2, the output of gear 58 will be zero.

If, however, the motor 30 is running at 300 r.p.m. counterclockwise, it will cause flexible cups 36 and 46 to rotate clockwise at a rate of 3 r.p.m. If motor 52 were not running, the flexible cup 46 would rotate around the elliptical disk 48 to create a standing wave in the cup at opposite ends of the major axis of the ellipse, which would rotate the gear 58 clockwise at a rate of 3 r.p.m. By running the motor 52 at 200 r.p.m. counterclockwise, the wave generator will form diametrically opposite waves in the flexible cup 46 traveling counterclockwise thereof and tending to rotate the cup in a clockwise direction at a rate of 2 r.p.m. This wave is traveling out of phase with the rotation of the cup by a speed of 1 r.p.m. To compensate for this out of phase relationship, the gear 58 is forced to rotate clockwise at a rate of 1 r.p.m.

Should the motor 52 be running faster than the motor 30, the wave created by the elliptical disk 48 would be out of phase with the rotation of the flexible cup 46 in the opposite direction, and would result in counterclockwise rotation of the output shaft or gear 58.

Thus, it may be seen that the speed reduction drive of the present invention provides for intermittent rotation of the output shaft in either direction merely by varying the relative speeds of two constantly running motors. Obviously, the device will operate effectively with the motors 30 and 52 running in opposite directions in view of the fact that the direction and speed of the output is dependent on the relative speeds of the motors 30 and 52 as shown hereinabove.

The instant invention may be utilized as a torque dividing device in a manner analogous to a conventional differential gear unit. Such an expedient requires, merely, that a source of rotational energy be connected to the shaft 58 (the rotatable internal gear), the motors 30 and 52 serving as output loads. The torque of the shaft 58 will be evenly divided between the two loads even though one of the loads may be restrained and therefore, rotate at a lesser speed than the other. The speeds of the motors may, of course, be varied by varying the speed of rotation of the shaft 58.

Obviously, many modifications and variations of the present invention are possible in the light of the above teachings. It is therefore to be understood that within the scope of the appended claims the invention may be practiced otherwise than as specifically described.

What is claimed is:
1. A dual stage harmonic drive unit, comprising
   a first harmonic drive unit including a fixed internal gear, a cooperating flexible gear, and an input motor operatively connected to said flexible gear,
   a second harmonic drive unit including a freely rotatable internal gear, a cooperating flexible gear, and a second input motor operatively connected to said last-mentioned flexible gear, and
   means rigidly connecting the flexible gears of said first and second harmonic drive units, whereby varying the input speeds of said first and second harmonic drive units controls the speed and direction of rotation of said rotatable, internal gear.
2. A dual stage harmonic drive unit, comprising a fixed internal gear,
   a first flexible gear mounted within said internal gear,
   means for causing said first gear to rotate within said internal gear,
   a freely rotatable, internal gear,
   a second flexible gear mounted within said freely rotatable gear,
   means structurally independent of said first-mentioned means for causing said second gear to rotate within said freely rotatable gear, and
   means rigidly connecting said first and second flexible gears whereby the speeds at which said first and second gears are caused to rotate within their respective internal gears controls the speed and direction of rotation of said rotatable internal gear.
3. The speed reduction drive of claim 2 in which said first and second flexible gears each have the same number of teeth, and said fixed and rotatable gears each have the same number of teeth.
4. The speed reduction gear of claim 2 in which the means for causing said first and second gears to rotate comprise a pair of wave generators having their input shafts coupled respectively to first and second motor means.
5. The invention as recited in claim 4 wherein each of said pair of wave generating means comprises a multiple lobed cam.
6. A torque dividing unit, comprising
   a first harmonic drive unit including a fixed internal gear, a cooperating flexible gear, a first wave generator operatively connected to said flexible gear, and a load connected to said first wave generator,
   a second harmonic drive unit including a rotatable internal gear, a cooperating flexible gear, a second wave generator structurally independent of said first wave generator operatively connected to said last-mentioned flexible gear, and a load connected to said second wave generator, and
   means rigidly connecting the flexible gears of said first and second harmonic drive units whereby a torque applied to said rotatable internal gear is divided equally between said loads.
7. A dual stage harmonic drive unit, including
   a first harmonic drive unit comprising relatively external and internal gears, one of which gears is in contact with the other at a plurality of spaced points with intermediate points at which the gears are out of mesh and contact and a wave generator acting on one of said gears which moves the points of contact around the gearing as said wave generator turns,
   a second harmonic drive unit comprising relatively external and internal gears, one of which gears is in contact with the other at a plurality of spaced points with intermediate points at which the gears are out of mesh and contact and a wave generator acting on one of said gears which moves the points of contact around the gearing as said wave generator turns, and
   means rigidly connecting the external gears of said first and second harmonic drive units whereby the speed and direction of rotation of one of said sets of internal gears will be solely a function of the relative input speeds of said first and second harmonic drive units.
8. The invention as set forth in claim 7, wherein one of said internal gears is fixed and one of said internal gears is free to rotate.
9. The invention as recited in claim 8, wherein the number of teeth in said external gears of said first and second harmonic drive units are the same, and said sets of internal gears of said first and second harmonic drive units have the same number of teeth.
10. The invention as set forth in claim 7, additionally including motor means connected to each of said wave generators of said first and second harmonic drive units.

References Cited by the Examiner
UNITED STATES PATENTS

| 724,663 | 4/03 | Clennam | 74—675 |
| 2,966,808 | 1/61 | Grudin | 74—805 |

DON A. WAITE, *Primary Examiner.*